United States Patent [19]

Jahme

[11] Patent Number: 4,602,518

[45] Date of Patent: Jul. 29, 1986

[54] MECHANISM FOR SELECTIVELY CONVERTING A CONTINUOUS ROTARY MOVEMENT TO A PHASE-RELATED SINGLE PIVOTING MOVEMENT OF A CONTROL LEVER

[76] Inventor: Hans-Joachim Jahme, Eckernfordest. 1, 6200 Wiesdbaden, Fed. Rep. of Germany

[21] Appl. No.: 545,248

[22] Filed: Oct. 25, 1983

[30] Foreign Application Priority Data

Oct. 26, 1982 [DE] Fed. Rep. of Germany ....... 3239579

[51] Int. Cl.⁴ ............................................. F16H 21/44
[52] U.S. Cl. ........................................................ 74/96
[58] Field of Search .................... 74/96, 97; 192/33 R

[56] References Cited

U.S. PATENT DOCUMENTS

| | | | |
|---|---|---|---|
| 3,048,045 | 8/1962 | Ryck et al. ........................... | 74/96 X |
| 4,023,423 | 5/1977 | Johne et al. .............................. | 74/96 |
| 4,271,872 | 6/1981 | Pfarrwaller .......................... | 74/96 X |

*Primary Examiner*—William E. Tapolcai
*Attorney, Agent, or Firm*—Cushman, Darby & Cushman

[57] ABSTRACT

The invention relates to a mechanism for selectively converting a continuous rotary movement in apparatus such as a high-speed-printing machine to a phase-related single pivoting movement of a control lever, with that single control movement following by an immediate reset to the initial position regardless of the time of activation of the mechanism. An entrainment lever supported on a supporting pin is coupled by means such as an excentric drive to the continuous rotary movement of the machine to generate a continuous pitching movement. A control lever is mounted for rotation on the same support pin and mounts a bistable mechanism (tensioning lever, pawl 3, tensioning spring 21) which in its first stable condition allows the entrainment lever to oscillate freely and which can assume its second stable condition when entrainment lever is in a dead center position, causing an engagement surface to be offered to the entrainment lever with the range of its pivoting movement. Control lever is spring-biased towards entrainment lever by return spring, and the control movement of control lever causes said bistable mechanism to be reset to its first stable condition by means of a reset lever.

6 Claims, 3 Drawing Figures

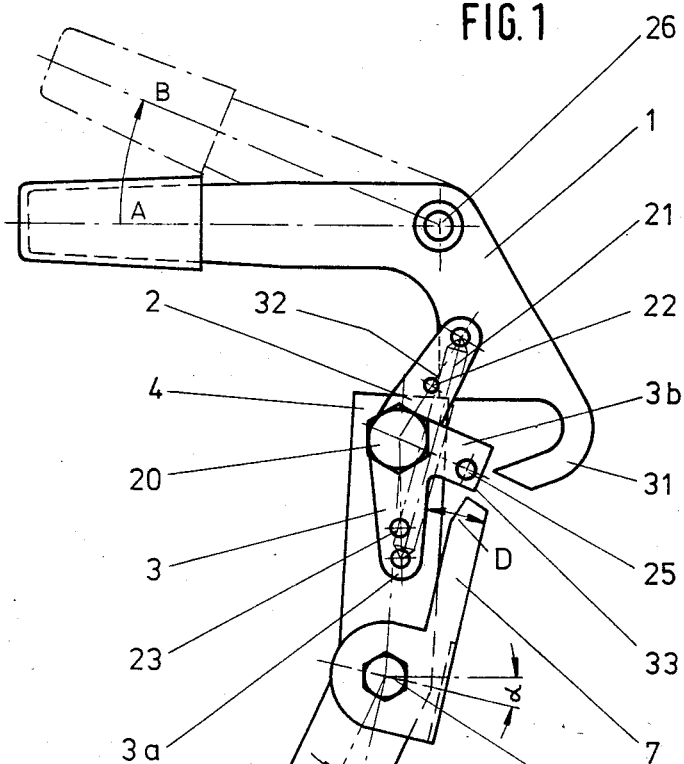
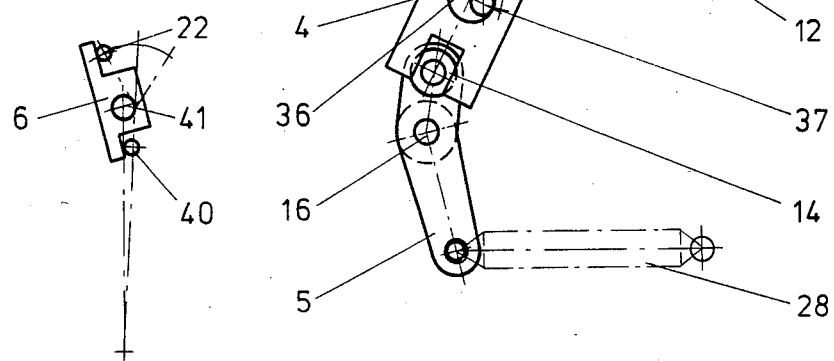
FIG. 1
FIG. 3

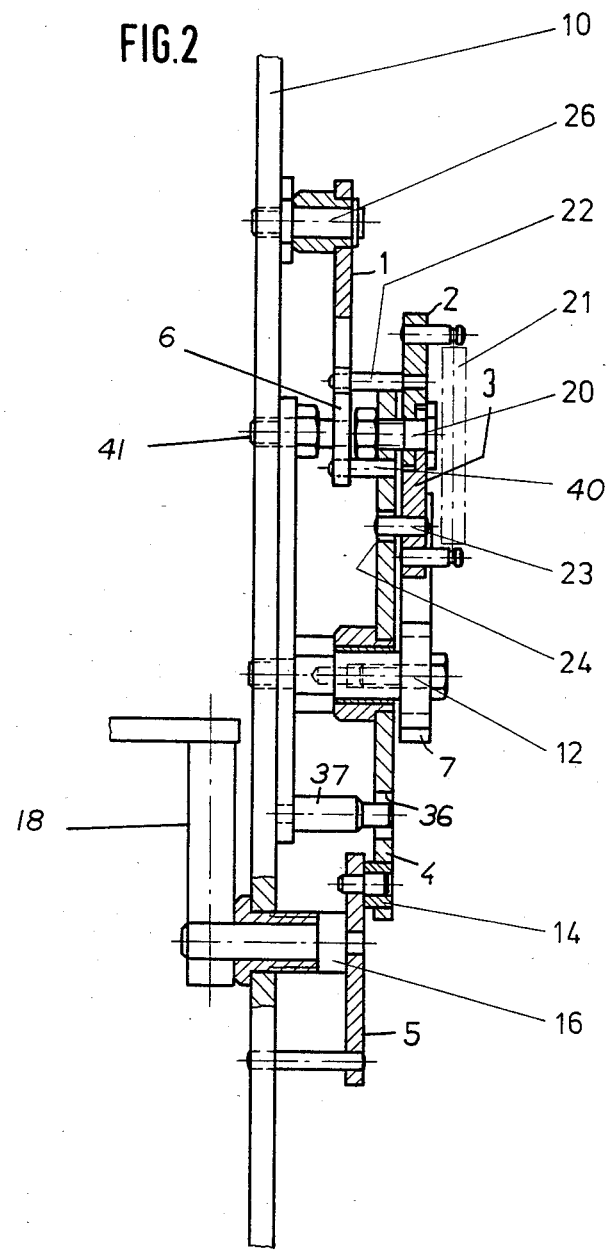

MECHANISM FOR SELECTIVELY CONVERTING A CONTINUOUS ROTARY MOVEMENT TO A PHASE-RELATED SINGLE PIVOTING MOVEMENT OF A CONTROL LEVER

FIELD OF THE INVENTION

The invention relates to a converting mechanism useful in machines such as high-speed offset printing machines, to instantaneously operate a diverter for withdrawing a sample sheet or proof sheet which must take place at a precisely defined time within the machine operating cycle.

BACKGROUND OF THE INVENTION

A mechanism for a phase-related single actuation of a control lever at a desired time after the mechanism has been activated and at a precisely defined time within the machine cycle is of substantial utility in a wide variety of applications—such as in diverters for the withdrawal of sample sheets or proofs from printing machines, as mentioned above. Diverters of this kind may, of course, be actuated by solenoid-operated lever assemblies, with the time of actuation automatically controlled by suitably placed control means such as a light-emitter photosensor combination. Where the time available for actuation is very short, however, electromagnetic actuation tends to become unreliable owing to the response characteristics of the solenoid and other factors. In the case of printing machines, this may be so if printing proceeds at rates of up to 36,000 sheets per hour and especially when it is desired to only withdraw a single proof sheet at a particular desired time in order to check results at that moment.

It is the object of the invention to provide means to perform such a single converting operation at a precisely defined time within the machine cycle and to immediately return the mechanism to its initial condition. Further, the converting operation is preferably derived from the continuous rotary movement in the machine and being independent from the time of activation of the converting means.

SUMMARY OF THE INVENTION

In accordance with the invention this object is achieved by establishing a driving connection between a continuously pitching entrainment lever and a control lever through a unique bistable mechanism. The duration of the converting operation is only one machine cycle or a complete oscillation of the entrainment lever. After having been activated, the bistable mechanism cannot drop in front of the oscillating entrainment lever before the latter is in its dead center position, i.e. in its starting position. Subsequent entrainment of the control lever will cause the bistable mechanism to be reset immediately to its starting condition through a reset lever mounted on the machine frame so that the control lever, being spring-biased towards the entrainment lever, is released from the driving connection with the entrainment lever, i.e. de-activated. This occurs right after one pivoting cycle has been completed, as the bistable mechanism jumps back into its initial condition in which the entrainment lever swings freely without actuating the control lever.

As the bistable mechanism cannot drop in front of the entrainment lever unless the latter assumes a specific, i.e., its one dead center, position, there exists at any time a precisely defined angular or phase relationship between the machine cycle and the pivoting movement of the control lever.

Suitable transmission linkage maybe provided to amplify any relatively slight movement of the control lever to a magnitude sufficient for use in the individual case.

Other objects, features, and characteristics of the present invention as well as the methods and operation and functions of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 1 schematically shows a front elevational view of the converting mechanism;

FIG. 2 shows a side elevational view of the converting mechanism with parts shown in section for clarity; and FIG. 3 shows enlarged view of the reset lever used in the structure as shown in FIG. 1.

DETAILED DESCRIPTION OF THE PREFERRED EMBODIMENT OF THE PRESENT INVENTION

Turning first to FIGS. 1 and 2, an entrainment lever 7 is pivotally mounted on a pin 12 provided on machine frame 10. Entrainment lever 7 is continuously driven by the machine in such a way that it will continuously pivot or pitch synchronously with the machine cycle, as indicated by the double arrow D. Such movement may be generated by means such as an excentric drive (not shown).

In order to provide the aforementioned single pivoting movement of control lever 4, which in the drawing is indicated by angle a, there is mounted on control lever 4 a spring-biased assembly of levers, herein referred to as the bistable mechanism, comprising a tensioning lever 2 and a pawl 3 to cooperate with another reset lever 6, shown in FIG. 3, mounted on machine frame 10. This lever assembly cooperates with triggering lever 1 to cause abutment surface 33 of pawl 3 to swing radially into the path of movement of entrainment lever 7 for one machine cycle and at a specific time within the machine cycle, whereby control lever 4 will follow the continuous movement of the entrainment lever 7 to the left (in FIG. 1) just once and be returned subsequently to its starting position by return spring 28.

The assembly of levers generating this single pivoting movement will be explained below. A pin 20 is provided on the end of control lever 4, opposite pin 12, to support both tensioning lever 2 and pawl 3 for limited pivoting movement, as will be shown in greater detail. The oppositely directed ends of tensioning lever 2 and pawl 3 are connected by a spring 21 under tension and these members are biased towards each other. Tensioning lever 2 has a pin 22 in a position substantially midways between its axis of rotation (pin 20) and the anchoring point of tensioning spring 21, with pin 22 extending a very short distance beyond the end surface of control lever 4 as shown in FIG. 2. The pivoting movement of tensioning lever 2 on either side of the longitudinal central axis of the upper portion of control lever 4 is limited by pin 22 as it engages the upper end surface of control lever 4 in its two end positions.

As shown in FIGS. 1 and 2, pawl 3 is angular in construction, i.e. it consists of a main portion 3a extending between support pin 20 and the anchoring point of tensioning spring 21, and of a tab portion 3b angularly disposed relative to main portion 3a and having thereon the previously mentioned abutment surface 33. The pivoting movement of pawl 3 is similarly limited by a pin 23 provided on pawl 3 in the main portion 3a thereof between supporting pin 20 and the point where tensioning spring 21 is attached. Pin 23 will fit within and engage an enlarged bore 24 provided in control lever 4. In accordance with the size of bore 24 in relation to the diameter of pin 23 on pawl 3, pawl 3 can pivot about support pin 20 to a limited extent.

Pawl 3 is in the form of an angular or bent lever, and its tab portion 3b supports on its end opposite supporting pin 20 a retaining pin 25 which serves to temporarily retain pawl 3 in its initial position, shown in FIG. 1, i.e. the position in which entrainment lever 7 cannot actuate control lever 4 through pawl 3.

As shown in FIG. 2, pin 22 on tensioning lever 2 projects beyond the end surface of control lever 4 into the pivoting plane of triggering lever 1. As shown in FIG. 1, triggering lever 1 has an actuating surface 32 extending substantially radially with respect to pivoting pin 26. Actuating surface 32 moves tensioning lever pin 22 to the left (in FIG. 1) in response to the triggering levr being moved in the direction of arrow AB (and as shown in phantom) so that the anchoring point of tensioning spring 21 moves to the left of the longitudinal center axis of the upper portion of control lever 4. As a result, the tension in spring 21 will cause a right-hand torque to act on pawl 3. Pawl 3 at that time is unable to respond to the right-hand torque because retaining pin 25 engages the inner surface of the hook-shaped end 31 of triggering lever 1. Thus, control lever 4 cannot move at that time either.

It is the subsequent return pivoting movement of triggering lever 1 in a direction opposite to arrow AB which enables pawl 3 to follow the right-hand torque generated by spring 21 and to place surface 33 in front of the oscillating entrainment lever 7. In fact, this latter movement into the path of entrainment lever 7 is possible at a specific time only, namely, when entrainment lever 7 is near the right-hand dead center position of the oscillating movement indicated by double arrow D; at any other time, tab portion 3b of the pawl will engage the upper end surface of entrainment lever 7.

In other words, pawl 3 will not be able to drop in front of entrainment lever 7 until triggering lever 1 has been returned to its initial position A and entrainment lever 7 has reached its rear dead center position. In the subsequent forward pivoting movement (to the left in FIG. 1) according to double arrow D, entrainment lever 7 urges control lever 4 to the left owing to the engagement thereof of pawl 3 so that diverter 18 will be pivoted via the lower portion of control lever 4 and transmission lever 5, which basically constitute a lever-type transmission assembly serving to increase the angle of rotation.

In the following return swing of entrainment lever 7 (to the right in FIG. 1), control lever 4, having mounted thereon the lever assembly comprised of tensioning lever 2 and pawl 3, will be caused to follow due to the force of return spring 28, which acts on transmission lever 5.

In the lower portion of control lever 4 there is provided a movement limiting bore 36 to receive a limiting pin 37 which has a substantially smaller diameter than bore 36 and is mounted directly on machine frame 10 so as to be adjustable by suitable means (such as an excentric bearing member) to displace the angular range of the pivoting movement of the lower portion of control lever 4. At the same time, this movement limiting action serves to release the force-locked connection between engagement surface 33 on pawl 3 and the front surface of entrainment lever 7 near the right-hand dead center position of the pivoting movement indicated by double arrow D so that pawl 3 can be returned to its initial position shown in FIG. 1, enabling entrainment lever 7 to resume its free oscillatory movement.

In order to reset the pawl this way, it is necessary to return tensioning lever 2 to its initial position as shown inclined to the right in FIG. 1, within the single pivoting movement of control lever 4. This is achieved with the aid of a two-armed reset lever 6, shown in FIG. 3, provided between machine frame 10 and control lever 4 and mounted on a bearing pin 41 secured on machine frame 10. Reset lever 6 has one end thereof pivoted by a reset pin 40 provided on control lever 4 in a way to cause the opposite end of reset lever 6 to urge tensioning lever pin 22 back to its initial position; attention is directed in this respect to FIG. 3. Reset lever 6 in FIG. 3 is not shown in FIG. 1 or 2 for reasons of clarity However, bearing pin 41 for reset lever 6 is indicated schematically in FIG. 2.

Thus, the mechanism is capable in its initial position of deriving from the continuously pitching movement of entrainment lever 7 a single pivoting movement at a precisely defined time, without the time of activation of the mechanism affecting the beginning or end of that single pivoting movement. This function is obtained as follows starting from the quiescent condition shown in FIG. 1. First, triggering lever 1 is moved from position A to position B, as shown by arrow AB, causing the hook-shaped end 31 of triggering lever 1 to move underneath retaining pin 25 so that pawl 3 coupled thereto cannot drop into the path of the entrainment lever. As triggering lever 1 is moved from A to B, its actuating surface 32 urges pin 22 on tensioning lever 2 into a mirror-image extreme position relative to the longitudinal center axis of control lever 4 so that tensioning lever 2 tries to pull pawl 3 into the path of movement of entrainment lever 7, which is not possible at that time due to the interaction of retaining pin 25 and the hook-shaped end 31 of triggering lever 1. Pawl 3 will only be released by returning the triggering lever 1 to its initial position, thereby releasing retaining pin 25; however, pawl 3 cannot drop into the path of entrainment member 7 until the latter has reached its right-hand dead center position. What this amounts to is that the driving connection between pawl 3 and entrainment member 7 is made always at the same time relative to the machine cycle, and regardless of the time when triggering lever 1 is moved in or out. Thus, control lever 4 can follow the movement of entrainment member 7, i.e. the latter will urge control lever 4 to the left (in FIG. 1) against the force exerted by return spring 28. At the same time, pivoting control lever 4 in a counterclockwise direction causes reset pin 40 which is fixedly connected to control lever 4 on the side opposite the viewer in FIG. 1, to perform a corresponding movement, namely, to move to the left, as in FIG. 3, and to urge reset lever 6, which is mounted on bearing pin 41 on machine frame 10, in a clockwise direction. The other end of reset lever 6 urges pin 22 on tensioning lever 2 and, as a consequence, tensioning lever 2 itself to the right again (in FIG. 1). Because of tensioning spring 21, pivoting the control lever 4 and the action of reset lever 6 will cause a left-hand torque to act on pawl 3, which will immediately rotate out of the path of entrainment member 7 when limiting means 36, 37 release the force-locked connection between the entrainment member 7 and the engagement surface 33 on the pawl near the righthand dead center position of entrainment lever 7.

While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims, which scope is to be accorded the broadest interpretation so as to encompass all such modifications and equivalent structures.

What is claimed is:

1. A mechanism for selectively converting a continuous rotary movement in a machine, having a machine frame, such as a high-speed printing machine, to a single phase-related pivoting movement for a control lever, said mechanism including an entrainment lever pivotally mounted on a pin and coupled through means such as an excentric drive to a source of continuous rotary movement to generate a continuous pitching movement, said control lever mounted pivotally on said pin, bistable mechanism means, operated by said control lever and movable between first and second stable positions, so that in said first stable position said entrainment lever is permitted to swing freely and in said second stable position, an abutment surface is placed in the path of said entrainment lever, said bistable mechanism means being movable into said second stable position when said entrainment lever is in a dead center position, said bistable mechanism further including reset means for resetting said bistable mechanism means to its first stable position.

2. A mechanism as in claim 1, wherein said bistable mechanism means comprises two one-armed levers mounted on a common pin secured to said control lever, each of said levers having their mutually distal ends biased towards each other by a tensioning spring, said levers being mounted so that the range of the pivoting movement of said one-armed levers on either side of the central longitudinal axis of said control lever is limited to a predetermined range of movement, and wherein one of said one-arm levers further includes a tab projecting laterally towards said entrainment lever which will act as said abutment surface in said second stable position of said bistable mechanism.

3. A mechanism as in claim 2 further including a triggering arm pivotally secured to said machine frame, said triggering arm being pivoted to engage and move the other of said one-arm levers into its second stable position, said triggering arm having a hook-shaped end to engage said one of said one arm levers and retain that one lever in its first stable position until said triggering arm is pivoted back into its initial position.

4. A mechanism as in claim 2 wherein said tab is provided in the plane of the pivoting movement of said entrainment lever in a manner such that said tab can only drop in front of said entrainment lever when said entrainment lever is in a rear dead center position.

5. A mechanism as in claim 1 wherein said control lever includes movement limiting means comprising a pin engaging a bore of correspondingly greater size provided in control lever.

6. A mechanism as in claim 5 wherein the pivoting movement of said control lever is amplified by suitable transmission means.

* * * * *